(No Model.)
J. KELLY.
Wheel-Scraper for Corn-Planters.
No. 228,080. Patented May 25, 1880.
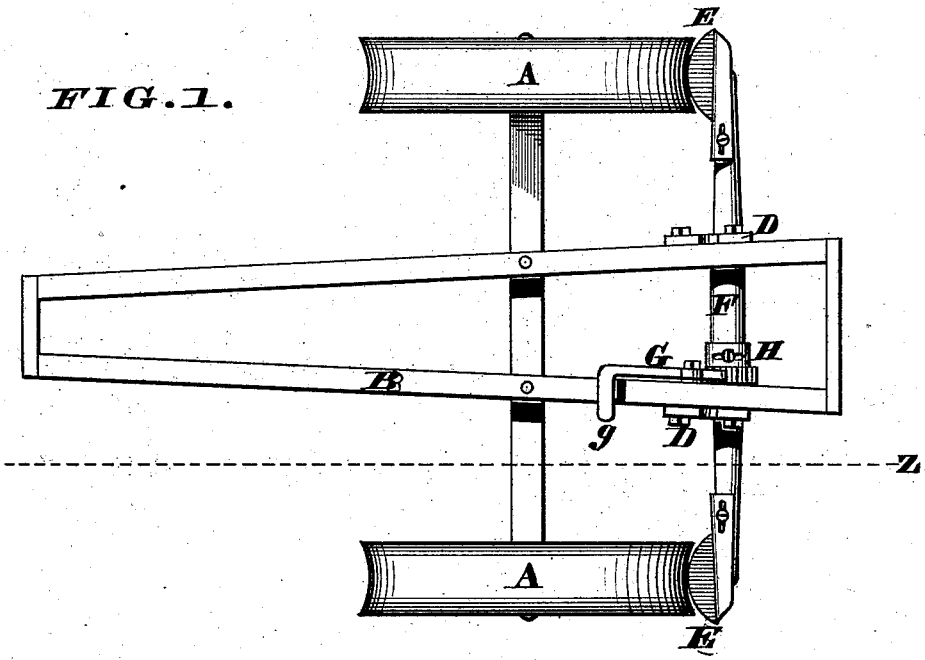
FIG. 1.
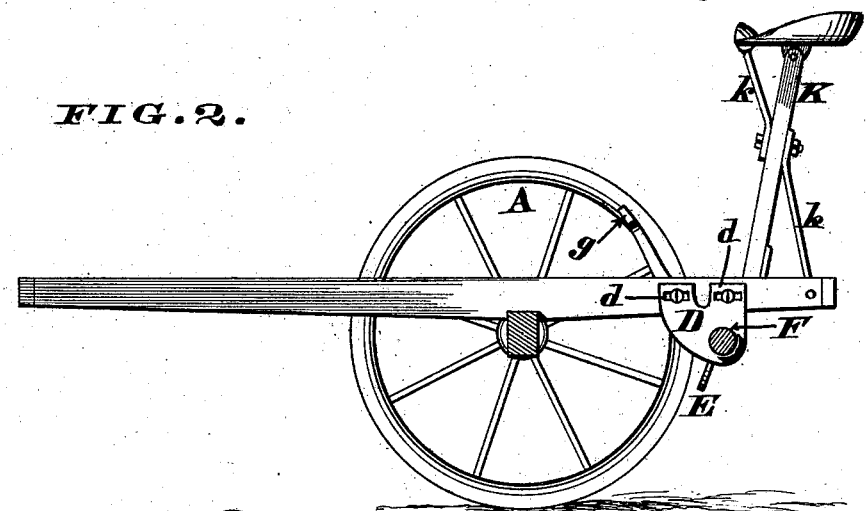
FIG. 2.
FIG. 3.
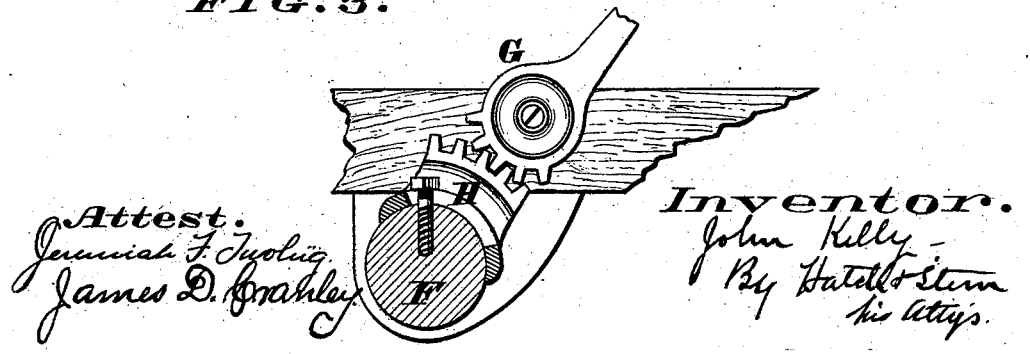
Attest:
Jeremiah F. Juoling
James D. Brahley
Inventor.
John Kelly
By Hatch & Stern
his Atty's.
N. PETERS, PHOTO-LITHOGRAPHER, WASHINGTON, D. C.

UNITED STATES PATENT OFFICE.

JOHN KELLY, OF TROY, OHIO, ASSIGNOR TO HIMSELF AND ASA T. BEEDLE, OF SAME PLACE.

WHEEL-SCRAPER FOR CORN-PLANTERS.

SPECIFICATION forming part of Letters Patent No. 228,080, dated May 25, 1880.

Application filed March 26, 1880. (No model.)

*To all whom it may concern:*

Be it known that I, JOHN KELLY, of Troy, in the county of Miami and State of Ohio, have invented a new and useful Improvement in Wheel-Scrapers for Corn-Planters; and I do hereby declare the following to be a full, clear, and exact description thereof, reference being had to the accompanying drawings, making part of this specification.

Figure 1 is a top-plan view of the scraper attached to the wheels of a corn-planter. Fig. 2 is a vertical section taken at the line Z Z. Fig. 3 is a section showing the toothed segment and the cogged pinion.

Similar letters of reference indicate corresponding parts.

The object of this invention is to provide a simple and efficient mechanism for cleaning or scraping the wheels of seeding-machines; and the invention consists in the combination of a transverse shaft journaled in bearings on the frame of the machine in rear of the wheels and having at each end a wheel-scraper, a toothed segment attached to said shaft, and a pinion meshing with the segment and provided with a lever for actuating it to rotate the shaft and bring the scrapers into or out of contact with the peripheries of the wheels.

The invention also consists of certain other features, whereby the parts are capable of being adjusted, all of which will be fully hereinafter described.

To enable those skilled in the art to understand my invention, I will describe the best mode of carrying it into effect.

In the accompanying drawings, A A represent the wheels of a corn-planter, with broad concave periphery, and B a part of the frame. D D are journaled bearings, bolted to the frame through slots $d\, d$, so that they may be adjusted on the frame and set near to or farther from the wheels, by which the scraper, when in operation, may be made to come in contact or close to the wheels, at a greater or less angle, as may be desired. E E are ordinary scrapers, made of size and shape to fit the periphery of the wheel, and bolted or secured to the rock-shaft F through slots, so that they can be moved and adjusted to the wheels. G is a cogged pinion pivoted to the frame, of which the upper end may be formed for foot-treadle, the other working in the teeth of the cogged segment H, which is attached to the rock-shaft F by bolts through slots, so that it can be moved round the shaft and fastened at any desired position. The seat K is made adjustable by bolts in the braces $k\, k$, the seat turning on trunnions, through which the bolt K' passes. By the adjustment of the braces and the toothed segment H on the rock-shaft any desired purchase on the treadle $g$ may be obtained.

The teeth of the pinion G working in the cogs of the segment H will rock the shaft F, throwing the scrapers toward or away from the wheels. Thus by a simple pressure on the pinion at the treadle the scrapers are thrown close to or against the concave surface of the wheels, by which all earth or other matter is scraped from the surface of the wheels.

Heretofore wheel-scrapers have been hung on independent depending bars connected by intermediate links with a pedal-lever so arranged that by its weight the scrapers are normally kept in contact with the peripheries of the wheels; but such is not my invention. Further, toothed wheels or segments and pinions connected with treadles have been connected with drill teeth or hoes for changing the position of the same; but neither is such my invention.

What I claim, and desire to secure by Letters Patent, is—

1. The combination, with the frame mounted on wheels, of a horizontal transverse shaft journaled in bearings on the frame in rear of the said wheels and having at each end a wheel-scraper, a toothed segment attached to said shaft, and a pinion meshing with the segment and provided with a lever for actuating it to rotate the shaft and bring the scrapers into contact with the peripheries of the wheels, substantially as described.

2. The combination, with the frame mounted on wheels, of the horizontal adjustable bearings D, the transverse horizontal shaft F, loosely journaled in said bearings and having at each of its ends a wheel-scraper, E, the toothed segment H, connected with said horizontal shaft and capable of being adjusted partially around the periphery of the same, and the pinion G, engaging said segment and having a lever for operating it, substantially as and for the purpose described.

3. The combination, with the frame, the axle, and the supporting-wheels, of a transverse shaft journaled in bearings in rear of the wheels and having at each of its outer ends a wheel-scraper, a toothed segment arranged to be adjusted partially around the periphery of said shaft, a driver's seat capable of a forward or rearward adjustment with respect to the adjustment of the toothed segment, and a treadle mechanism connecting with the toothed segment to rotate the scraper-shaft, substantially as described, for the purpose set forth.

JOHN KELLY.

Witnesses:
 J. A. DAVY,
 O. W. BAIR.